(12) United States Patent
Nakashima (10) Patent No.: US 9,502,712 B2
(45) Date of Patent: Nov. 22, 2016

(54) METHOD OF MANUFACTURING BATTERY ELECTRODE

(75) Inventor: Satoshi Nakashima, Sagamihara (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 180 days.

(21) Appl. No.: 14/241,777

(22) PCT Filed: Aug. 30, 2012

(86) PCT No.: PCT/JP2012/072002
§ 371 (c)(1),
(2), (4) Date: Feb. 27, 2014

(87) PCT Pub. No.: WO2013/031889
PCT Pub. Date: Mar. 7, 2013

(65) Prior Publication Data
US 2014/0227582 A1   Aug. 14, 2014

(30) Foreign Application Priority Data
Aug. 31, 2011   (JP) ................. 2011-188590

(51) Int. Cl.
*H01M 4/04*  (2006.01)
*H01M 4/08*  (2006.01)
*H01M 4/64*  (2006.01)
*H01M 4/13*  (2010.01)
(Continued)

(52) U.S. Cl.
CPC ............. *H01M 4/13* (2013.01); *H01M 4/0404* (2013.01); *H01M 4/139* (2013.01); *H01M 10/0525* (2013.01); *H01M 10/0585* (2013.01); *Y02E 60/122* (2013.01); *Y02P 70/54* (2015.11); *Y10T 29/49115* (2015.01)

(58) Field of Classification Search
USPC ................. 429/208–246; 29/623.1–623.5
See application file for complete search history.

(56) References Cited

U.S. PATENT DOCUMENTS

2002/0119367 A1   8/2002   Watanabe et al.

FOREIGN PATENT DOCUMENTS

JP   08-096802 A   4/1996
JP   10-275627 A   10/1998
(Continued)

OTHER PUBLICATIONS

Machine Translation of Fumitaka et al. (JP 2001-093515, published Apr. 2001, pp. 1-13).*
(Continued)

*Primary Examiner* — Basia Ridley
*Assistant Examiner* — Caitlin Wilmot
(74) *Attorney, Agent, or Firm* — Sughrue Mion, PLLC (57) ABSTRACT

Disclosed is a method of manufacturing a battery electrode in which a positive electrode lead tab and a negative electrode lead tab each of which is integrally formed with a collector formed of a metal foil and has excellent characteristics. The method includes separating a battery electrode having a desired size from a strip-shaped electrode in which an active material is intermittently applied onto a collector. The strip-shaped electrode includes an n-th application part, an n-th non-application part adjoining the n-th application part, and an (n+1)-th application part that adjoins the n-th non-application part on an opposite side at which the n-th application part adjoins the n-th non-application part (n is a positive integer). The battery electrode is cut out from the strip-shaped electrode, including at least the n-th application part, n-th non-application part, and (n+1)-th application part.

3 Claims, 6 Drawing Sheets

(51) Int. Cl.
*H01M 4/139* (2010.01)
*H01M 10/0525* (2010.01)
*H01M 10/0585* (2010.01)

(56) References Cited

FOREIGN PATENT DOCUMENTS

| | | |
|---|---|---|
| JP | 2001-093515 A | 4/2001 |
| JP | 2002-252023 A | 9/2002 |
| JP | 2008-140551 A | 6/2008 |
| JP | 2010-153132 A | 7/2010 |
| JP | 2011-034918 A | 2/2011 |
| WO | 2006/095579 A1 | 9/2006 |
| WO | 2012/137900 A1 | 10/2012 |

OTHER PUBLICATIONS

Communication dated Sep. 9, 2016 from the Japanese Patent Office in counterpart application No. 2013-531393.

* cited by examiner

METHOD OF MANUFACTURING BATTERY ELECTRODE

CROSS REFERENCE TO RELATED APPLICATIONS

This application is a National Stage of International Application No. PCT/JP2012/072002, filed Aug. 30, 2012, claiming priority from Japanese Patent Application No. 2011-188590, filed Aug. 31, 2011, the contents of all of which are incorporated herein by reference in their entirety.

TECHNICAL FIELD

The present invention relates to a method of manufacturing a battery electrode and, more particularly, to a method of manufacturing a battery electrode having a configuration in which an electrode active material is formed on a thin collector.

BACKGROUND ART

A positive electrode and a negative electrode of a lithium-ion battery or the like are manufactured as follows: an application part in which a positive electrode mixture and a negative electrode mixture are applied onto metal foil surfaces of a positive collector and a negative collector, respectively, and a non-application part are formed, followed by drying, and each of the resultant positive and negative collectors is cut into blocks each having a predetermined size.

In parallel with the cutting process of the positive and negative electrodes, positive- and negative-electrode lead tabs for establishing electrical conduction with respective the positive and negative collectors are cut from the non-application parts of the respective positive and negative collectors (see, for example, Patent Document 1).

PRIOR ART DOCUMENT

Patent Document

[Patent Document 1] JP2002-252023A

DISCLOSURE OF THE INVENTION

Problems to be Solved by the Invention

A method that integrally forms the positive electrode lead tab in the positive electrode active material non-application part and negative electrode lead tab in the negative electrode active material non-application part in parallel with the cutting process of a positive electrode base material and a negative electrode base material obtained by applying the positive- and negative-electrode active materials onto a metal foil collector can eliminate a process of joining the lead tabs respectively to the positive- and negative-electrodes.

Figure 6A:
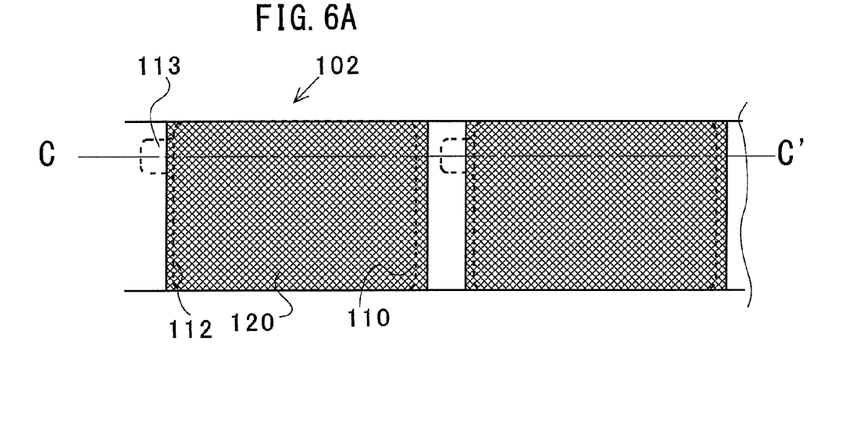
FIGS. 6A to 6C are a view for explaining a method of cutting a conventional positive electrode.
Figure 6B:
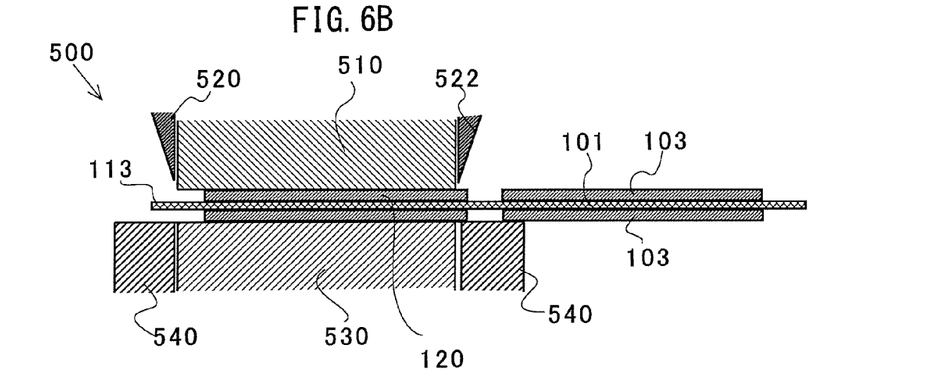
Figure 6C:
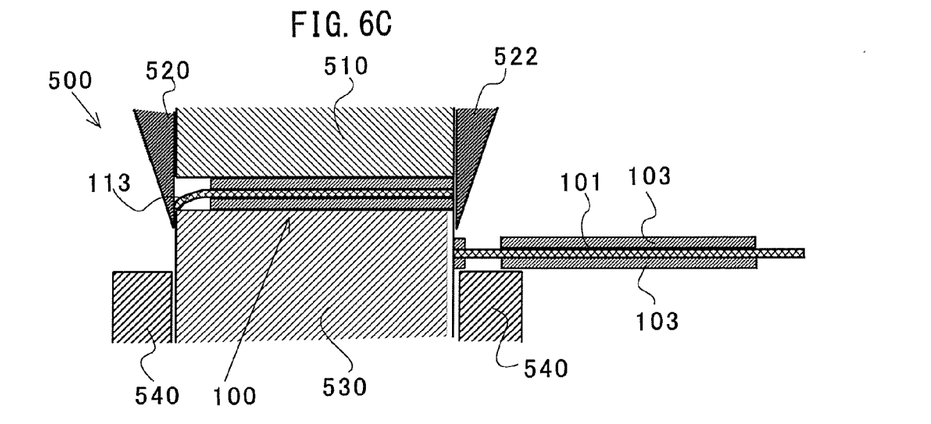

FIGS. 6A to 6C are views for explaining a conventional electrode cutting method.

FIG. 6A is a plan view for explaining a positive electrode base material. FIGS. 6B and 6C are each a cross-sectional view for explaining a cutting process of cutting the positive electrode base material using a cutting apparatus.

A cross-sectional view taken along a line C-C' passing through a positive electrode lead tab formation part 113 of a positive electrode base material 102 of FIG. 6A is illustrated in FIGS. 6B and 6C.

As illustrated in FIG. 6B, the positive electrode base material 102 is mounted to a cutting apparatus 500 in a state where it is held between an upper stripper 510 and a lower stripper 530 at both surfaces thereof and supported by an anvil 540.

The positive electrode base material 102 is fixed with both surfaces of a positive electrode part 110 acting as a battery reaction part of a positive electrode 100 held between the upper stripper 510 and lower stripper 530.

Cutting blades 520 and 522 provided on both ends of the upper stripper 510 come down and, at the same time, the lower stripper 530 comes up, whereby a material for positive electrode to be cut is cut off.

Figure 3A:
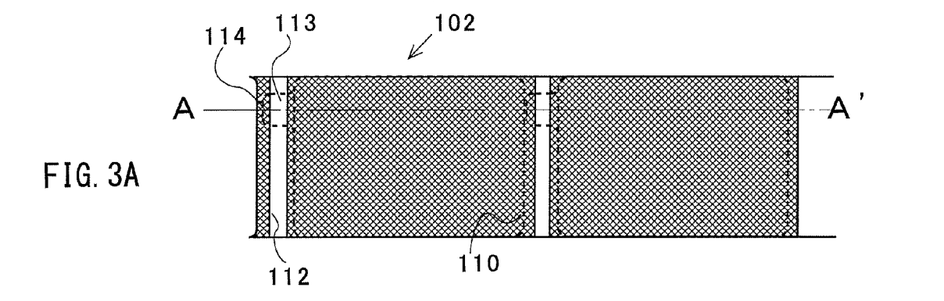
FIGS. 3A to 3C are views for explaining an example of a method of cutting a battery electrode in the present invention, which illustrate a method of cutting the positive electrode.
Figure 3B:
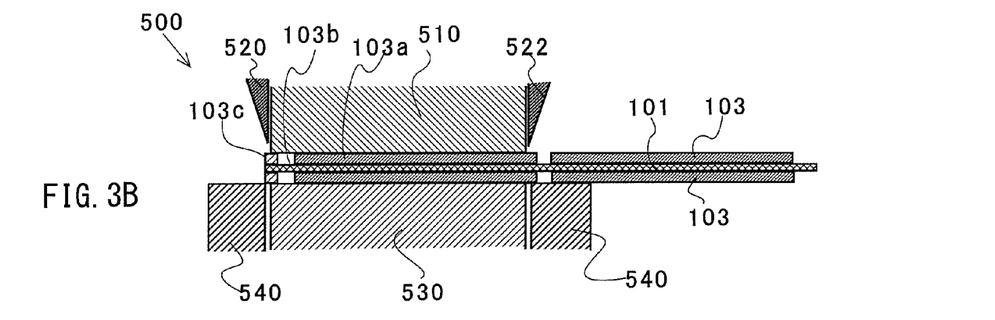
Figure 3C:
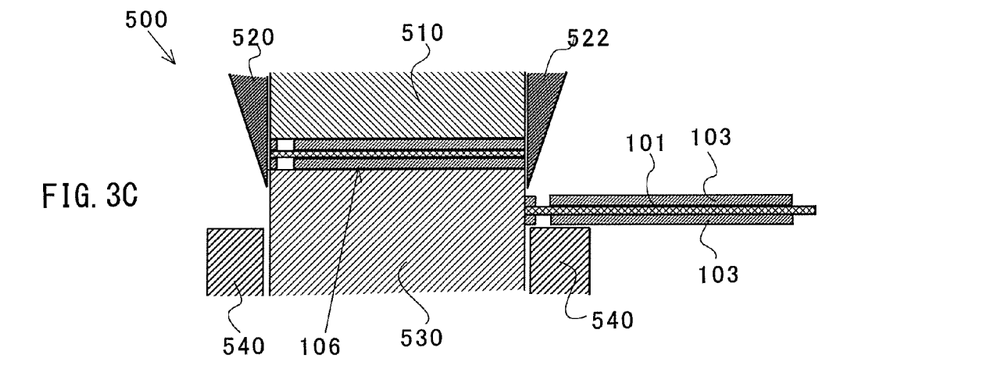

The positive electrode lead tab formation part 113 is not held between the upper and lower strippers 510 and 530 at the both surfaces thereof and is thus subjected to a force in a moving direction of the cutting blade 520 when being cut by the cutting blade 520, so that the positive electrode lead tab formation part 113 may be deformed or get wrinkled as illustrated in FIG. 3C.

An object of the present invention is to provide a method of manufacturing battery electrode that can provide a stacked secondary battery having positive and negative electrodes with excellent quality when the positive- and negative-electrode lead tabs are integrally formed respectively in the positive electrode active material non-application part and negative electrode active material non-application part in parallel with the cutting process of the positive- and negative-electrode base materials obtained by applying the positive- and negative-electrode active materials onto the metal foil collector, and to provide a battery manufactured according to the battery electrode manufacturing method.

Means for Solving the Problems

According to a first aspect of the present invention, which has been made to solve the above problem, there is provided a method of manufacturing a battery electrode, characterized by including separating a battery electrode from a strip-shaped electrode including an application part in which an active material is formed on a collector and a non-application part in which the active material is not formed on the collector such that the non-application part becomes an electrode lead tab, wherein the battery electrode is cut out from the strip-shaped electrode with a collector surface of the application part and a collector surface of the non-application part which will become the electrode lead tab retained in the same plane.

According to a second aspect of the present invention, there is provided a method of manufacturing a battery electrode, characterized by including separating an electrode having a desired size from a strip-shaped electrode in which an active material is intermittently applied onto a collector, wherein the strip-shaped electrode includes an n-th application part, an n-th non-application part adjoining the n-th application part, and an (n+1)-th application part that adjoins the n-th non-application part on an opposite side at which the n-th application part adjoins the n-th non-application part (n is a positive integer), and the battery electrode is cut out from the strip-shaped electrode, including at least the n-th application part, n-th non-application part, and (n+1)-th application part.

In the present invention, the (n+1)-th application part of the battery electrode is cut away.

In the present invention, the electrode is an electrode for a lithium-ion secondary battery.

Further, according to a third aspect of the present invention, there is provided a battery characterized by including a positive electrode and a negative electrode which are stacked through a separator, the positive electrode being cut out, from a strip-shaped electrode in which an active material is intermittently applied onto a collector and which includes an n-th application part, an n-th non-application part adjoining the n-th application part, and an (n+1)-th application part that adjoins the n-th non-application part on an opposite side at which the n-th application part adjoins the n-th non-application part (n is a positive integer), including at least the n-th application part, n-th non-application part, and (n+1)-th application part, the negative electrode being produced in the same manner as the positive electrode.

In the present invention, the term "substantially the same plane" includes a case where the collector surface of the application part and collector surface of the non-application part which will become the electrode lead tab are in the same plane such as a horizontal surface and also includes a case where they are slightly inclined to each other as long as the same effect as that obtained in the case where they are in the same plane can be obtained.

Advantages of the Invention

According to the battery electrode manufacturing method of the present invention, when the positive electrode lead tab and negative electrode lead tab are integrally produced with the positive electrode and negative electrode, respectively, each of the positive- and negative-electrode lead tab formation parts is cut out while holding the part of the leading end applied with each of the positive- and negative-electrode active material layers. Thus, even in a case where the positive- and negative-electrode lead tabs are each formed using a foil collector, the cut portion does not get wrinkled or is not deformed. This allows a battery electrode stable in quality to be provided.

MODE FOR CARRYING OUT THE INVENTION

The present invention will be described below with reference to the drawings with a lithium-ion battery taken as an example.

FIGS. 1A to 1D are views for explaining an example of a manufacturing process of positive and negative electrodes.

Although the positive and negative electrodes differ in constituent elements, they are manufactured by the same method. Thus, the following description will be made taking the positive electrode as an example.

The positive electrode is manufactured as follows: a slurry positive electrode mixture is intermittently applied onto both surfaces of a positive collector formed of a strip-shaped aluminum foil, followed by drying, the resultant positive collector is compressed using a roller press for shaping, as needed, and an obtained positive electrode base material is cut into blocks each having a predetermined size.

As the positive electrode mixture, a slurry positive electrode mixture obtained by dispersing a composite oxide containing lithium such as lithium-manganese composite oxide, lithium-cobalt composite oxide, lithium-nickel composite oxide, a conductive material such as carbon black, and a binding agent such as polyvinylidene fluoride into N-methyl-2-pyrrolidone can be used.

Figure 1A:
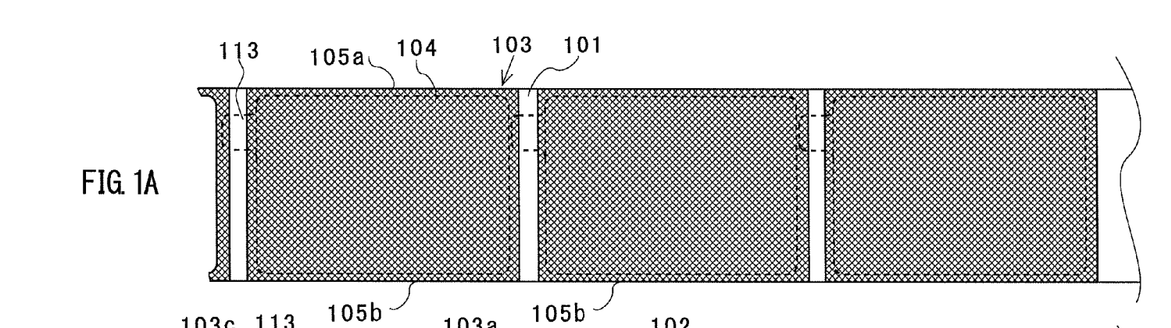
FIGS. 1A to 1D are views for explaining an example of a manufacturing process of positive and negative electrodes.

As illustrated in FIG. 1A, a positive electrode active material layer 103, which is depicted as a shaded area, is intermittently formed on a positive collector 101 onto a surface of which a positive electrode active material is applied. The intermittently-formed positive electrode active material layer 103 has an area larger than that of a positive electrode part outline 104 denoted by a dashed line.

Figure 1B:
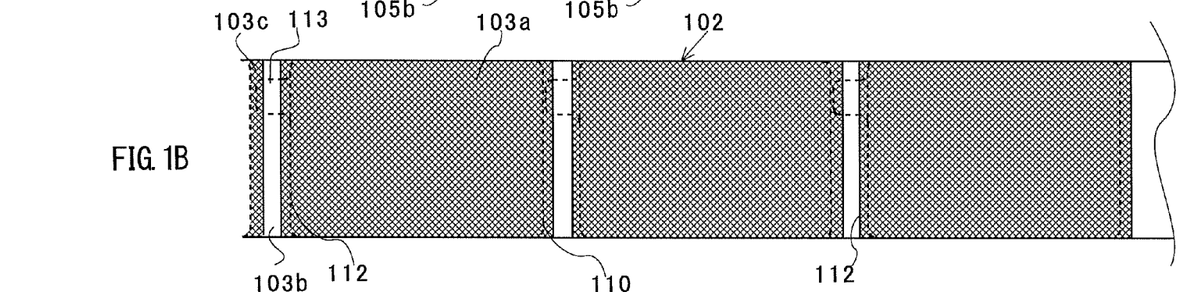

Subsequently, both side surfaces 105a and 105b of the positive collector 101 applied with the active material in a length direction thereof are cut along a predetermined positive electrode outline to obtain a positive electrode base material 102.

Subsequently, the positive electrode base material is cut along a first cutting line including a straight-line portion and both end curved-line portions (e.g., quadrant) while holding, at both surfaces thereof, an (n+1)-th (n is a positive integer) application part 103c of the positive electrode active material layer 103, which is intermittently applied onto the positive electrode base material 102 in the length direction, that adjoins an n-th non-application part 103b on an opposite side at which an n-th application part 103a adjoins the n-th non-application part 103b. In parallel with the cutting along the first cutting line 110, the positive electrode base material is cut along a second cutting line 112 to thereby obtain a cut body 106 for positive electrode illustrated in FIG. 1C with the positive electrode active material layer 103 left in a leading end 114 of a positive electrode lead tab formation part 113.

Figure 1C:
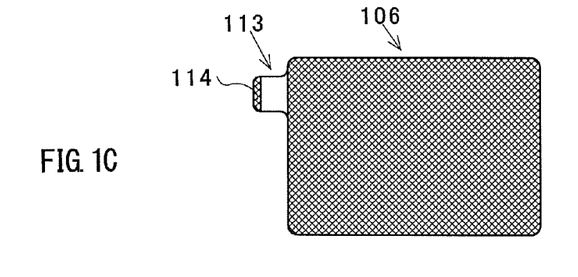

As described above, by performing the cutting while holding, at the both surfaces thereof, the positive electrode active material layer 103 in the vicinity of the leading end 114 of the positive electrode lead tab formation part 113, the positive electrode active material layer 103 is left in the leading end 114.

When the cutting is performed with the positive electrode active material layer 103 adjacent to the leading end 114 of the positive electrode lead tab formation part 113 left, it follows that a portion adjacent to the positive electrode lead tab formation part 113 is held at its both surfaces at the cutting process of the positive electrode lead tab formation part 113. This allows the positive electrode lead tab formation part 113 to be securely retained at the cutting process, which in turn prevents the positive electrode lead tab formation part 113 from being deformed or getting wrinkled.

Figure 1D:
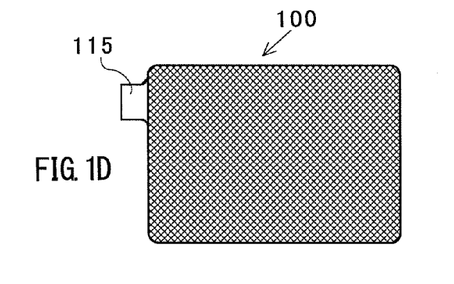

Here, there is a need to remove the portion applied with the positive electrode active material layer 103, which is left in the leading end 114 of the positive electrode lead tab formation part 113. By taking a dimension of the leading end applied with the positive electrode active material into consideration in producing the positive electrode lead tab formation part 113 from which a positive electrode lead tub is formed, it is possible to obtain a positive electrode 100 provided with the positive electrode lead tub having a predetermined dimension as illustrated in FIG. 1D simply by cutting and removing the leading end 114.

Figure 2A:
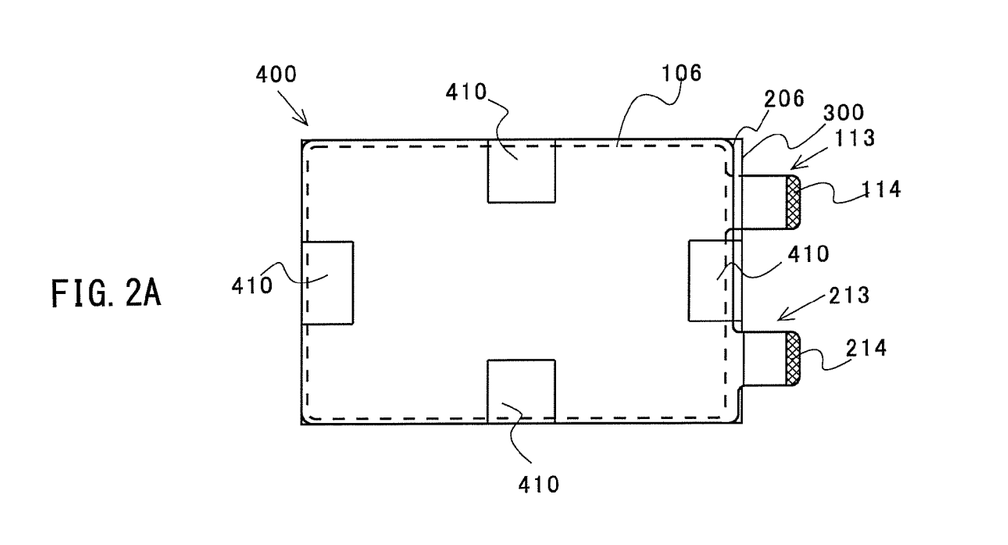
FIGS. 2A and 2B are views for explaining a manufacturing method of an electrode stacked body in which positive and negative electrodes are stacked opposite to each other through a separator.
Figure 2B:
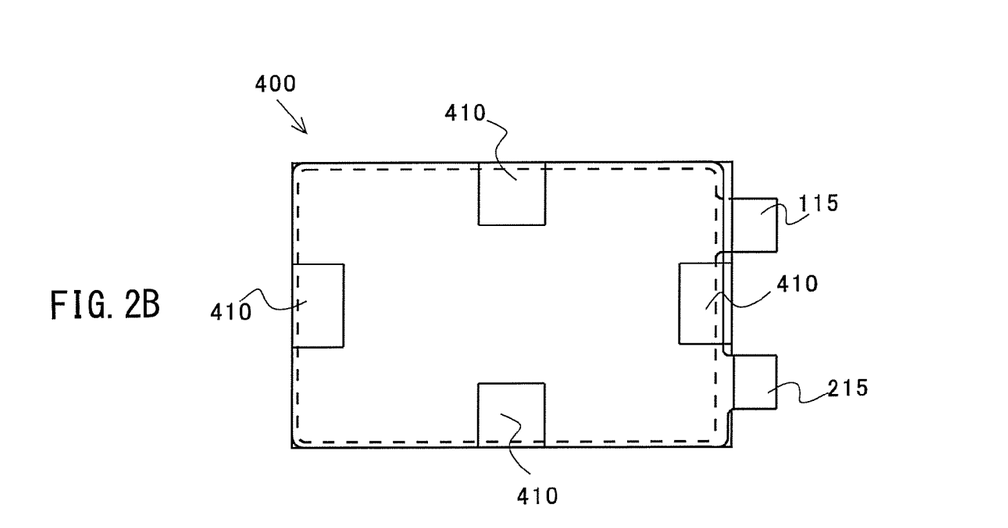

FIGS. 2A and 2B are views for explaining a manufacturing method of an electrode stacked body in which the positive and negative electrodes are stacked opposite to each other through a separator.

Cut bodies 106 and 206 for positive and negative electrodes having positive- and negative-electrode lead tab formation parts 113 and 213, respectively, are stacked through a separator 300 to produce an electrode stacked body 400. The Cut bodies 106 and 206 are fixed by a fixing tape 410 attached over both surfaces of the electrode stacked body 400 at a plurality positions so as to prevent the cut bodies 106 and 206 to be displaced from each other.

Subsequently, the positive electrode lead tab formation parts 113 drawn from the electrode stacked body are joined collectively to one another for integration by an ultrasonic joining means; similarly, the negative electrode lead tab formation parts 213 drawn from the electrode stacked body are joined collectively to one another for integration by the ultrasonic joining means. The leading end 114 applied with the positive electrode active material of the integrated positive electrode lead tab formation part 113 and leading end 214 applied with a negative electrode active material of the integrated negative electrode lead tab formation part 213 are each subjected to cutting. In the manner as described above, production of the electrode stacked body 400 in which positive electrode lead tabs 115 and negative electrode lead tubs 215 are each joined to one another is completed.

The obtained electrode stacked body 400 is subjected to sealing with a film-like covering material or accommodated in a square container and subjected to injection of electrolyte, whereby production of a battery is completed.

The following describes a method of cutting the cut body for positive electrode and cut body for negative electrode from the positive electrode based material and negative electrode based material in the present invention.

FIGS. 3A to 3C are views for explaining a method of cutting the electrode in the present invention, which specifically illustrates a method of producing the cut body for positive electrode.

FIG. 3A is plan view for explaining the positive electrode base material. FIGS. 3B and 3C are each a cross-sectional view for explaining a cutting process of cutting the positive electrode base material using a cutting apparatus.

A cross-sectional view taken along a line A-A' passing through the positive electrode lead tab formation part 113 of the positive electrode base material 102 of FIG. 3A is illustrated in FIGS. 3B and 3C.

As illustrated in FIG. 3B, the positive electrode base material 102 is mounted to a cutting apparatus 500 in a state where it is held between an upper stripper 510 and a lower stripper 530 at both surfaces and supported by an anvil 540.

The positive electrode base material 102 is fixed with not only a first application part 103a acting as the positive electrode but also an n-th non-application part 103b adjacent to an n-th application part 103a and an (n+1)-th application part 103c which is positioned on an opposite side to the n-th application part and which includes a part of the positive electrode lead tab formation part 113 that will be cut off later and a surrounding portion thereof held between the upper stripper 510 and lower stripper 530 at the both surface thereof.

Cutting blades 520 and 522 provided on both ends of the upper stripper 510 come down and, at the same time, the lower stripper 530 comes up. Then, the positive electrode base material is cut along a second cutting line 112 for taking the positive electrode lead tab such that the positive electrode active material layer 103 is left in the leading end of the positive electrode lead tab formation part 113 and, at the same time, cut along a first cutting line 110 which is defined on an opposite side to a portion from which the positive electrode lead tab formation part is taken, whereby the cut body 106 for positive electrode is obtained.

After that, the upper stripper 510 comes up, together with the cutting blades 520 and 522, and thus the cut body 106 for positive electrode can be taken. From the cut body 106 for positive electrode taken from the cutting apparatus 500, the portion applied with the positive electrode active material, which is left in the leading end of the positive electrode lead tab formation part 113 is cut out, whereby the positive electrode can be obtained.

In the electrode manufacturing method according to the present invention, the (n+1)-th application part 103c in the vicinity of the leading end 114 is held between the upper stripper 510 and lower stripper 530 at the both surfaces thereof, so that, as illustrated, even if there is a difference in level between the n-th application part 103a acting as the positive electrode and positive electrode lead tab formation part 113, the positive electrode lead tab formation part is not deformed or does not get wrinkled. That is, application of the manufacturing method of the present invention to such an intermittent application method allows separation to be achieved with the application part adjacent to the leading end of the positive electrode lead tab left, thereby preventing the cut portion from getting wrinkled or being deformed. This allows the positive electrode lead tab formation part having excellent quality to be obtained and in turn allows production of a secondary battery having excellent performance.

The cut body for negative electrode can be produced by the same process as the above-described positive electrode cutting process.

FIGS. 4A to 4D are views for explaining another example of the manufacturing process of the positive and negative electrodes.

As in the above example, although the positive and negative electrodes differ in constituent elements, they are manufactured by the same method. Thus, the following description will be made taking the positive electrode as an example.

Figure 4A:
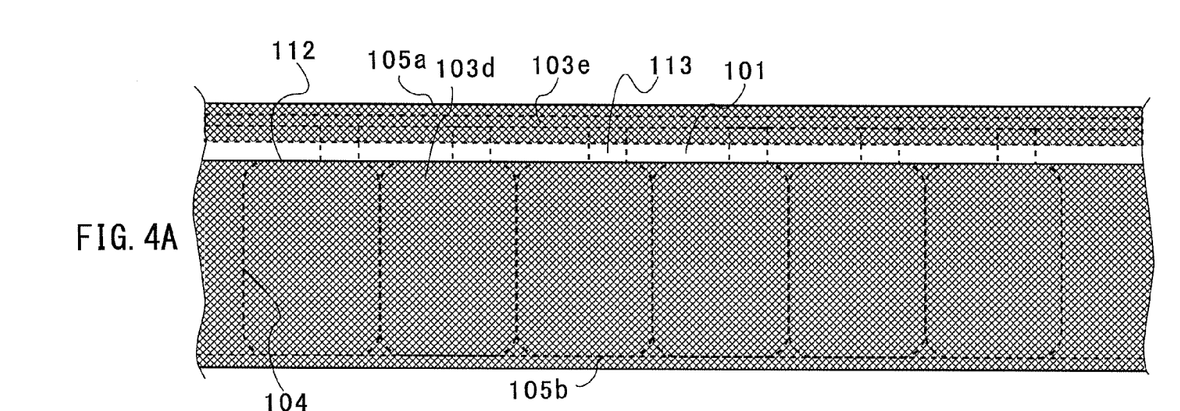
FIGS. 4A to 4D are views for explaining another example of the manufacturing process of the positive and negative electrodes.

As illustrated in FIG. 4A, the positive electrode active material layer 103, which is depicted as a shaded area, is formed on the positive collector 101 onto a surface of which the positive electrode active material is applied.

On the positive collector 101, there are positive electrode active material layers 103d and 103e each of which is depicted as a shaded area. The positive electrode is manufactured as follows: a slurry positive electrode mixture is applied onto the positive collector formed of a strip-shaped aluminum foil, followed by drying, to form the positive electrode active material layer, the resultant positive collector is compressed using a roller press for shaping, as needed, and an obtained positive electrode base material is cut into blocks each having a predetermined size. Subsequently, both side surfaces 105a and 105b of the positive collector 101 applied with the active material in a length direction thereof are cut along a predetermined positive electrode outline to obtain the positive electrode base material 102 illustrated in FIG. 4B.

Figures 4B, 4C, 4D:
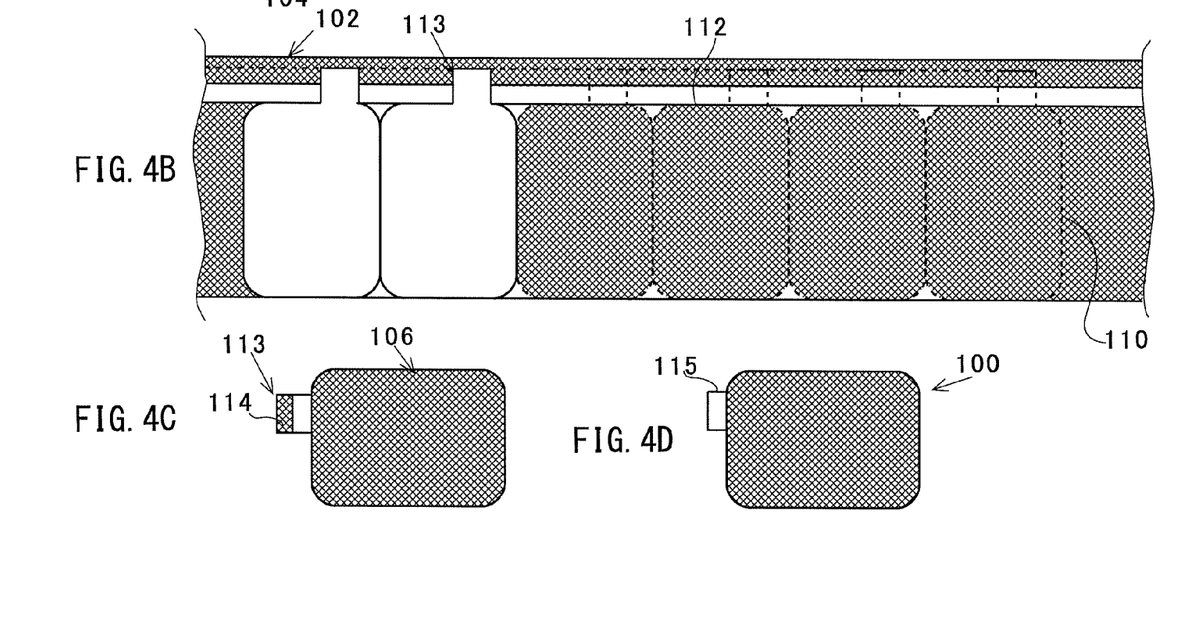

As illustrated in FIG. 4B, the non-application part of the present example, in which the positive electrode active material is not formed, is left between the positive electrode active material application parts 103d and 103e applied with the positive electrode mixture, and the positive electrode is produced by punching into a shape corresponding to a positive electrode outline 104 denoted by a dashed line.

Subsequently, punching is performed to produce the cut body 106 for positive electrode illustrated in FIG. 4C in which the positive electrode lead tab formation part 113 has the leading end 114 applied with the positive electrode active material layer. After that, only by cutting and removing the leading end 114, the positive electrode 100 provided with the positive electrode lead tab having a predetermined dimension can be obtained as illustrated in FIG. 4D.

As the positive electrode mixture, the same positive electrode mixture as that described in FIG. 1 can be used.

Figure 5A:
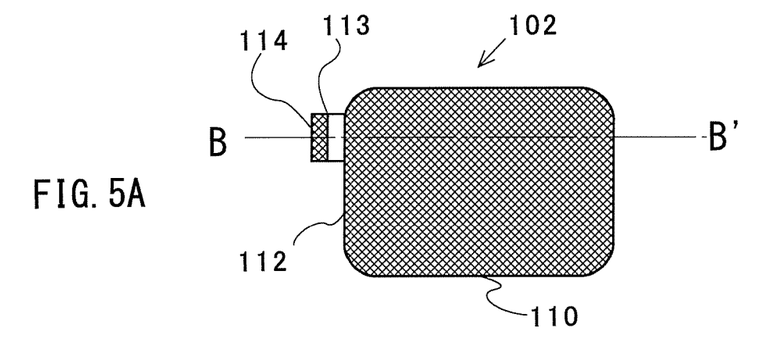
FIGS. 5A to 5C are views for explaining another example of a method of cutting a battery electrode in the present invention, which illustrate a method of cutting the positive electrode.
Figure 5B:
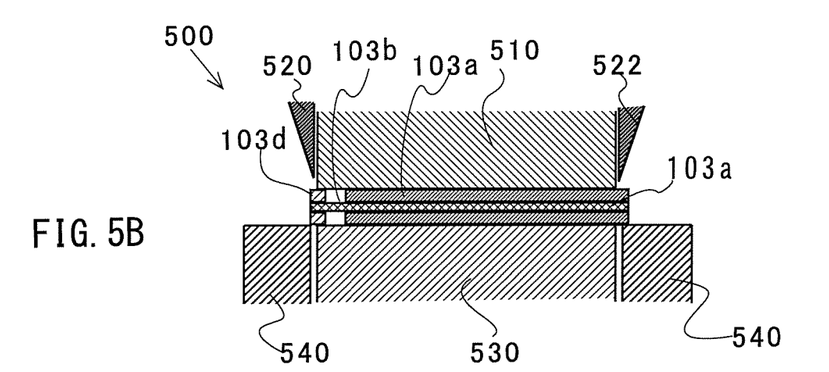
Figure 5C:
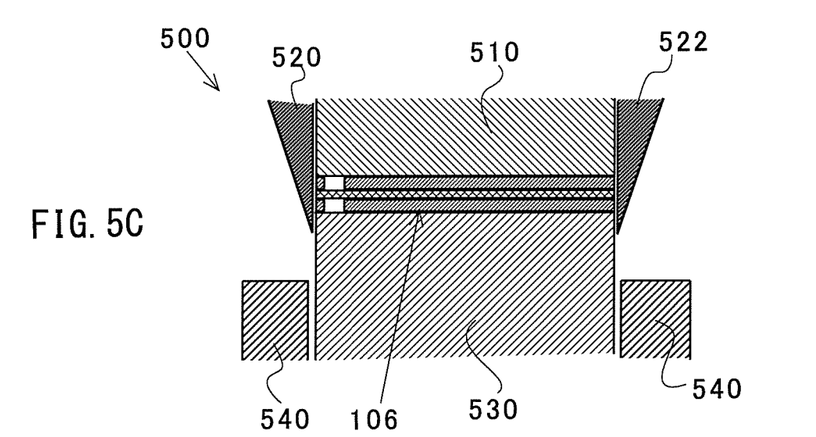

FIGS. 5A to 5C are views for explaining a method of cutting the electrode described using FIGS. 4A to 4D, which specifically illustrate a method of producing the cut body for positive electrode.

As in the example described using FIG. 3B, the positive electrode base material 106 is fixed with not only the first application part 103d acting as the positive electrode but also the positive electrode active material layer 103e of the leading end of the positive electrode lead tab held between the upper stripper 510 and lower stripper 530 at the both surface thereof, so that a collector surface acting as the positive electrode and a collector surface on the leading end of the positive electrode lead tab are retained in the same plane, thereby preventing the cut portion from getting wrinkled or being deformed. This allows the positive electrode lead tab formation part having excellent quality to be obtained and in turn allows production of a secondary battery having excellent performance.

Further, the positive electrode active material layer 103e of the leading end of the positive electrode lead tab is formed independently of the portion acting as the positive electrode, so that also by applying a synthetic resin composition not containing the positive electrode active material to the positive electrode active material layer 103e to a thickness equal to that of the positive electrode material layer, it is possible to obtain the effect of the present invention as in the case where the positive electrode material is applied.

The cut body for positive electrode and cut body for negative electrode produced as described in the above examples are stacked through the separator, and the stacked body is then accommodated in a film-like covering material or a battery can and subjected to sealing after injection of electrolyte, whereby production of a battery is completed.

INDUSTRIAL APPLICABILITY

According to the battery electrode manufacturing method of the present invention, when the positive electrode lead tab and negative electrode lead tab are integrally produced by cutting the electrode base material obtained by intermittently applying the electrode active material onto the collector formed of a thin metal foil, the positive- and negative electrode lead tab formation parts are not deformed or do not get wrinkled, thereby allowing a battery excellent in characteristics to be manufactured effectively.

EXPLANATION OF REFERENCE SYMBOLS

100: Positive electrode
101: Positive collector
102: Positive electrode base material
103: Positive electrode active material layer
103a: n-th application part
103b: n-th non-application part
103c: (n+1)-th application part
103d: Positive electrode active material layer
103e: Positive electrode active material layer
104: Positive electrode outline
105a, 105b: Both side surfaces
106: Cut body for positive electrode
110: First cutting line
112: Second cutting line
113: Positive electrode lead tab formation part
114: Leading end
115: Positive electrode lead tab
206: Cut body for negative electrode
213: Negative electrode lead tab formation part
214: Leading end
215: Negative electrode lead tab
300: Separator
400: Electrode stacked body
410: Fixing tape
500: Cutting apparatus
510: Upper stripper
520: Cutting blade
522: Cutting blade
530: Lower stripper
540: Anvil

The invention claimed is:

1. A method of manufacturing a battery electrode, comprising separating a battery electrode having a desired size from a strip-shaped electrode in which an active material is intermittently applied onto a collector including an application part in which an active material is formed on a collector and a non-application part in which the active material is not formed on the collector such that the non-application part becomes an electrode lead tab, wherein,
   when the battery electrode is cut out from the strip-shaped electrode, a collector surface of the application part and a collector surface of the non-application part which will become the electrode lead tab are retained in the same plane, and a first cutting line which is defined on an opposite side to a portion from which an electrode lead tab formation part is taken and a second cutting line for taking the electrode lead tab are simultaneously punched out,
   the strip-shaped electrode includes an n-th application part, an n-th non-application part adjoining the n-th application part, and an (n+1)-th application part that adjoins the n-th non-application part on an opposite side at which the n-th application part adjoins the n-th non-application part, wherein n is a positive integer, and
   the battery electrode is cut out from the strip-shaped electrode, including at least the n-th application part, n-th non-application part, and (n+1)-th application part, the first cutting line and the second cutting line simultaneously cuts out the n-th and n+1)-th application part.

2. The method according to claim 1, wherein the (n+1)-th application part of the battery electrode is cut away.

3. The method according to claim 1, wherein the battery electrode is an electrode for a lithium-ion secondary battery.

UNITED STATES PATENT AND TRADEMARK OFFICE
CERTIFICATE OF CORRECTION

PATENT NO. : 9,502,712 B2
APPLICATION NO. : 14/241777
DATED : November 22, 2016
INVENTOR(S) : Satoshi Nakashima It is certified that error appears in the above-identified patent and that said Letters Patent is hereby corrected as shown below:

In the Specification

Column 2, Line 20: Delete "3C." and insert --6C.--

In the Claims

Column 8, Line 60: In Claim 1, delete "n+1)-th" and insert --(n+1)-th--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*